Patented Jan. 7, 1941

2,227,805

UNITED STATES PATENT OFFICE 2,227,805

ALLYL-TYPE ETHERS OF DIHYDROXY-DIPHENYLS

Edgar C. Britton and John E. Livak, Midland, Mich., assignors to The Dow Chemical Company, Midland, Mich., a corporation of Michigan No Drawing. Application June 23, 1939, Serial No. 280,844

8 Claims. (Cl. 260—613)

This invention relates to certain new unsaturated aromatic ethers, and in particular concerns allyl-type ethers of dihydroxy-diphenyls having the general formula

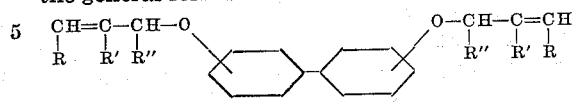

wherein R represents hydrogen, lower alkyl, or aryl, R' represents hydrogen, lower alkyl, or halogen, and R'' represents hydrogen or lower alkyl. Examples of such compounds are 4,4'-di-allyloxy-diphenyl, 2,2'-di-(2-chloroallyloxy)-diphenyl, 4,4'-di-crotyloxy-diphenyl, 3,3'-di-(2-methallyloxy)-diphenyl, 2,4'-di-(3-ethylallyloxy)-diphenyl, 2,2'-di-cinnamyloxy-diphenyl, 4,4'-di-(2-propylallyloxy)-diphenyl, etc.

The new ethers having the above general formula are usually obtained in the form of white crystalline solids which are substantially insoluble in water and are only partially soluble in common organic solvents such as benzene, ethanol, carbon tetrachloride, acetone, petroleum ether, etc. They are useful as plasticizing or modifying agents in the preparation of synthetic plastic compositions and as intermediates in the preparation of dyes and dye intermediates, detergents, wetting agents, pharmaceuticals, etc. As disclosed in our co-pending application, Serial No. 280,845, filed June 23, 1939, these ethers may be rearranged to form dialkenyl-dihydroxy-diphenyls, which compounds have a variety of uses as intermediates, condensation agents, etc.

The allyl-type ethers of the present class are prepared by heating a metal salt of a dihydroxy-diphenyl (or a mixture of a dihydroxy-diphenyl and an aqueous or alcoholic alkali) with an allyl-type halide, such as allyl chloride, 2-chloroallyl chloride, crotyl bromide, 3-ethylallyl bromide, 2-methallyl chloride, 1-propylallyl bromide, cinnamyl bromide, etc. Any of the possible isomeric dihydroxy-diphenyls, e. g. 4,4'-dihydroxy-diphenyl, 2,2'-dihydroxy-diphenyl, 3,3'-dihydroxy-diphenyl, 2,4'-dihydroxy-diphenyl, etc. may be employed as the phenolic reactant in preparing the new products although the ethers of 4,4'-dihydroxy-diphenyl at present appear to have the widest field of use. The alkali employed in the reaction is preferably an alkali-metal hydroxide, such as sodium or potassium hydroxide.

The reaction for the formation of the new ethers is preferably carried out by dissolving the dihydroxy-diphenyl compound in an approximately equimolecular proportion of the alkali in the form of a 5–20 per cent alcoholic solution, and thereafter heating the resultant solution at reflux temperature with an approximately equimolecular proportion of the allyl-type halide. The reaction is usually complete in from 2 to 6 hours depending upon the particular reactants employed. Upon completion of the reaction, the mixture is cooled, washed with water to remove inorganic halide and any unreacted alkali, and the ether product is purified by crystallization from a suitable organic solvent.

The following examples illustrate several ways in which the principle of the invention has been applied, but are not to be construed as limiting the same.

Example 1

79.8 grams (0.40 mol) of 4,4'-dihydroxy-diphenyl was dissolved in 574 grams of an alcoholic alkali solution prepared by dissolving 34 grams (0.80 mol) of 96 per cent sodium hydroxide in 540 grams of 93 per cent ethanol. The resulting mixture was placed in a flask fitted with a reflux condenser, thermometer, and stirrer and was heated to reflux temperature to effect complete solution. 79.5 grams (0.88 mol) of 2-methallyl chloride was then added drop-wise with stirring over a period of 15 minutes, after which time heating was continued at reflux temperature (65°–75° C.) for 2½ hours. The mixture was diluted with 250 grams of water, heated to reflux temperature, cooled, and the insoluble ether product was filtered off by suction. There was obtained 100.2 grams of 4,4'-di-(2-methallyloxy)-diphenyl, a white crystalline solid which, after recrystallization from benzene, had a melting point of 139°–140° C. 4,4'-di-(2-methallyloxy)-diphenyl has the formula

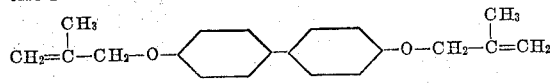

Example 2

79.8 grams (0.40 mol) of 4,4'-dihydroxy-diphenyl was dissolved in 574 grams of an alcoholic solution containing 34 grams (0.40 mol) of 96 per cent sodium hydroxide. 97.5 grams (0.88 mol)

of 2-chloroallyl chloride was then added dropwise over a period of 15 minutes after which time the mixture was heated at reflux temperature for 2 hours. During the heating the ether product separated out of solution in the form of white crystals. The mixture was diluted with 250 grams of water, heated to reflux temperature, and cooled to 20° C. The crystals were filtered from the mother liquor, washed with cold ethanol, and were recrystallized from ethyl alcohol solution whereby 4,4'-di-(2-chloroallyloxy)-diphenyl was obtained in the form of glistening white plates which melted at 127°–128° C. 4,4'-di-(2-chloroallyloxy)-diphenyl has the formula

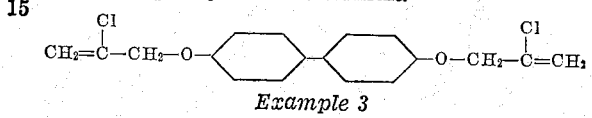

*Example 3*

46.5 grams (0.25 mol) of 4,4'-dihydroxy-diphenyl was dissolved in 225 grams of an alcoholic solution containing 22.0 grams (0.52 mol) of 96 per cent sodium hydroxide. After heating the mixture to effect complete solution, 42.0 grams (0.55 mol) of allyl chloride was added drop-wise with stirring over a period of 15 minutes. The mixture was then heated at reflux temperature (62°–76° C.) for 2½ hours after which time it was diluted with water and filtered as in Example 1. There was obtained 4,4'-di-allyloxy-diphenyl, a white crystalline solid having a melting point of 150.5°–151.5° C. and the formula

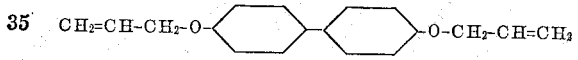

*Example 4*

79.8 grams (0.40 mol) of 4,4'-dihydroxy-diphenyl was dissolved in 474 grams of an alcoholic solution containing 34 grams (0.80 mol) of 96 per cent sodium hydroxide as in Example 1, after which time 76.5 grams (0.85 mol) of crotyl chloride was added over a period of 15 minutes. The mixture was then heated at reflux temperature for 2 hours, diluted with water, and filtered. The precipitate was recrystallized from glacial acetic acid and benzene whereby there was obtained 4,4'-di-crotyloxy-diphenyl, a white crystalline solid having a melting point of 165°–166° C. and the formula

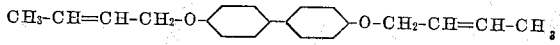

Other unsaturated ethers of the present class which may be prepared by reacting an allyl-type halide with a dihydroxy-diphenyl as herein described include 2,2'-di-allyloxy-diphenyl, 2,2'-di-(2-ethylallyloxy)-diphenyl, 4,4'-di-(3-propylallyloxy)-diphenyl, 3,3'-di-(2-bromoallyloxy)-diphenyl, 2,4'-di-allyloxy-diphenyl, 4,4'-di-(3-isobutyl-allyloxy)-diphenyl, 2,2'-di-(1-ethylallyloxy)-diphenyl, 4,4'-di-(2-amylallyloxy)-diphenyl, etc.

Other modes of applying the principle of our invention may be employed instead of those explained, change being made as regards the method herein disclosed or the materials employed, provided the product stated by any of the following claims or the equivalent of such stated product be obtained.

We therefore particularly point out and distinctly claim as our invention:

1. An unsaturated ether of a dihydroxy-diphenyl having the general formula

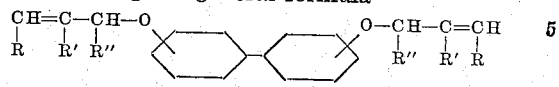

wherein R represents a substituent selected from the group consisting of hydrogen, lower alkyl, and phenyl radicals, R' represents a substituent selected from the group consisting of hydrogen, chlorine, bromine, and lower alkyl radicals, and R'' represents a substituent selected from the group consisting of hydrogen and lower alkyl radicals.

2. An unsaturated ether of 4,4'-dihydroxy-diphenyl having the general formula

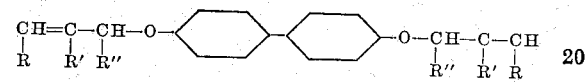

wherein R represents a substituent selected from the group consisting of hydrogen, lower alkyl, and phenyl radicals, R' represents a substituent selected from the group consisting of hydrogen, chlorine, bromine, and lower alkyl radicals, and R'' represents a substituent selected from the group consisting of hydrogen and lower alkyl radicals.

3. An allyl ether of a dihydroxy-diphenyl having the general formula

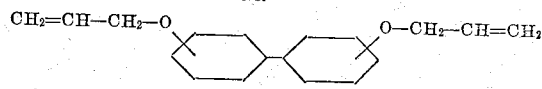

4. A methylallyl ether of a dihydroxy-diphenyl having the general formula

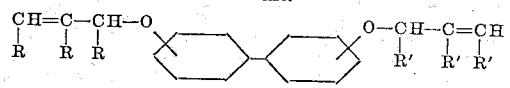

wherein one of the Rs and R's represents a methyl group and the other Rs and R's represent hydrogen.

5. A 2-chloroallyl ether of a dihydroxy-diphenyl having the general formula

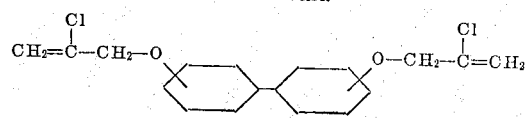

6. 4,4'-di-allyloxy-diphenyl, a white crystalline solid melting at approximately 150.5°–151.5° C. and having the general formula

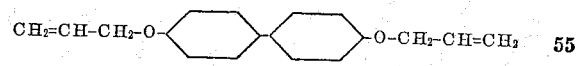

7. 4,4'-di-crotyloxy-diphenyl, a white crystalline solid melting at approximately 165°–166° C. and having the general formula

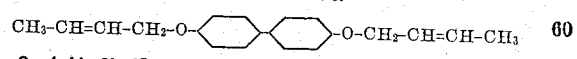

8. 4,4'-di-(2-chloroallyloxy)-diphenyl, a white crystalline solid melting at approximately 127°–128° C. and having the general formula

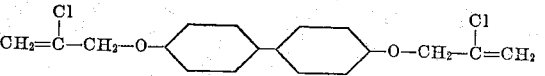

EDGAR C. BRITTON.
JOHN E. LIVAK.